3,822,997
CYANO-, HYDROXY-, METHOXY-, OR ACETOXY-METHYL BIPHENYL OR DIPHENYL OXIDE ASSISTED DISPERSE DYEING

Hans Wegmueller, Riehen, Switzerland, Alain Lauton, St. Louis, France, and Karl Heinz Keller, Riehen, Switzerland, assignors to Ciba-Geigy AG, Basel, Switzerland
No Drawing. Filed July 11, 1972, Ser. No. 270,752
Claims priority, application Switzerland, July 23, 1971, 10,886/71
Int. Cl. D06p 5/06
U.S. Cl. 8—172                                    9 Claims

ABSTRACT OF THE DISCLOSURE

A process for dyeing and printing synthetic fibre material, preferably polyester fibre material, with disperse dyes is provided. The process is carried out utilising a substituted biphenyl or biphenyl ether dyeing accelerator. The biphenyl compounds are mono-, di- or trisubstituted with radicals of the formula —$CH_2$—R, wherein R represents CN, cycloalkyl, aralkoxy, —O—A or

—O—CO—A, wherein A is hydrogen or alkyl.

---

The invention relates to a process for dyeing and printing synthetic fibre material with disperse dyes in the presence of a dyeing accelerator, wherein said dyeing accelerator corresponds to the formula (1) 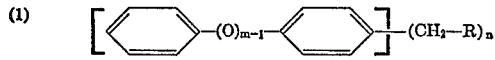

in which R represents cyano, —O—A, cycloalkoxy, aralkoxy or —O—CO—A, wherein A represents hydrogen or alkyl, m is 1 or 2 and n is an integer from 1 to 3.

Particularly suitable dyeing accelerators or carriers are compounds of the formula (2) 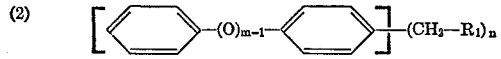

wherein $R_1$ represents —O-cycloalkyl containing 5 or 6 ring carbon atoms, —O-alkyl-phenyl containing 1 or 2 carbon atoms in the alkyl radical, but represents in particular —CN, O—$A_1$ or —O—CO—$A_1$, wherein $A_1$ represents hydrogen or alkyl containing from 1 to 4 carbon atoms, m is 1 or 2 and n is an integer from 1 to 3, and the radical or radicals of the formula —($CH_2$—$R_1$)$_n$ contain altogether at most 12 carbon atoms and are in the ortho- and para-position of the two benzene rings.

Particular interest attaches to the inventive process wherein carriers of the formula (3) 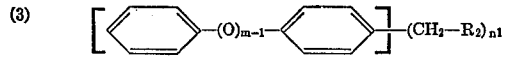

are used, in which $R_2$ represents —O-cyclohexyl, —O-benzyl, but in particular —CN, —O—$A_1$ or —O—CO—$A_2$, wherein $A_1$ represents hydrogen or alkyl containing from 1 to 4 carbon atoms and $A_2$ represents hydrogen or methyl, $n_1$ is an integer from 1 to 2 and m is 1 or 2, and the radical or radicals of the formula (—$CH_2$—$R_2$)$_{n_1}$ contain altogether from 2 to 8 carbon atoms and are in the ortho- and para-position of the two benzene rings.

Particularly preferred is the use of carriers of the formula (4) 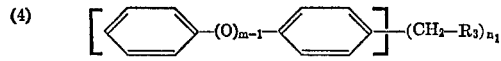

wherein $R_3$ represents —CN, —OH, —O—$CH_3$ or —O—CO—$CH_3$, m is 1 or 2 and $n_1$ is an integer from 1 to 2, and the radical or radicals of the formula (—$CH_2$—$R_3$)$_{n_1}$ are in the ortho- and para-position of the two benzene rings.

The carriers of the formulae (1) to (4) are mostly isomer mixtures wherein the substituents are preferably in the ortho- and para- position of the two benzene rings. The ratio of the isomers to each other also changes depending on the reaction conditions and starting materials chosen in the manufacture of the compounds of the formula (1). Where n=1, p-isomers are obtained in amounts of e.g. 30 to 90% and o-isomers in amounts of e.g. 70 to 100%. Where n=2 or 3, the ratios become complicated and where n=2, for example, p,p'-, o,o- or o,p'-compounds are obtained in addition to o- and p-compounds.

Accordingly, the compounds of the formula (1) are generally in the form of mixtures, in particular of mono- and disubstituted compounds, i.e. n is not either 1, 2 or 3, but may also be any fractional number in between, for example 1.4, 1.5 or 1.6.

It is possible to determine the amounts of the different isomers in the carrier mixtures by chromatography or NMR spectroscopy.

The compounds of the formula (1) are manufactured by methods which are known in the art. The diphenyl or diphenyl ether is converted initially into the chloromethyldiphenyl or chloromethyldiphenyl ether, e.g. with formaldehyde and hydrogen chloride. The compounds of the formula (1) are obtained in the form of liquid products by reacting the primary products with the corresponding alkali alcoholates or alkali salts of the corresponding carboxylic acids and, optionally, by subsequent saponification.

The synthetic fibre material to be dyed consists, for example, of fibres produced from polyamide, polyester or cellulose triacetate. Fibre materials which contain polyester are chiefly preferred. These may take the form of fibre blends of different polyesters with one another or with other fibres, for example, polyester/wool, polyester/cellulose or polyester/polyacrylonitrile. Of pre-eminent interest, however, are pure polyester fibre materials, particularly linear polyester fibres from aromatic polycarboxylic acids with polyvalent alcohols, e.g., polyethylene glycol terephthalate or poly-(1,4-cyclohexane-dimethylol-teretaphthalate) fibres. The fibres are preferably textile materials in the form of woven or knitted goods.

The disperse dyes to be used which are only very sparingly soluble in water and are present in the dyebath very largely in the form of a fine suspension, may belong to the most diverse classes of dyes, for example to azo, anthraquinone, perinone, quinophthalone, styryl or nitro dyes.

Besides the dye and the dyeing accelerator, the dye-bath may optionally contain still further additives which are conventionally used for dyeing synthetic fibres, for example compounds such as condensation products of higher fatty acids with aminoalkylsulphonates, e.g. taurine, or sulphated addition products of ethylene oxide with higher fatty acids, also salts, such as sodium sulphate, ammonium sulphate, sodium or ammonium phosphates and polyphosphates, and acids, such as sulphuric, acetic or formic acid.

The dyeing accelerators to be used according to the invention are applied in solution or in the form of an aqueous suspension. Suitable solvents for this purpose are organic compounds which are miscible with water, such as lower alcohols, e.g. tetrahydrofurfuryl alcohol or β-methoxyethanol.

Suitable emulsifiers are chiefly anionic surfactants, e.g. dodecylbenzenesulphonates, dibutylnaphthalenesulphonates and, in particular, the sodium salt of sulphosuccinic acid dioctyl ester.

The dyebaths contain 0.1 to 10 g./l., advantageously 0.5 to 10 g./l., preferably 1 to 6 g./l. of the dyeing accelerator of the formula (1).

The fibre materials may be dyed with disperse dyes by the conventional carrier dyeing process, wherein known dyeing machines, such as winch vats, jiggers, star frame dyeing, cross-wound bobbin dyeing or beam dyeing apparatus, are used. The process may be carried out in such a manner that the goods are initially treated with the dyeing accelerator and then dyed or treated simultaneously with the dyeing accelerator and the dye.

The goods, for example, are given a preliminary treatment with the dyeing accelerator and, optionally, further additives at 60 to 70° C. in a bath which has been adjusted to a pH of 3 to 6.5. The dye is then added in the form of an aqueous suspension and the temperature is continually raised to boiling temperature and, if pressure apparatus is used, up to 140° C.

It is also possible to add the carrier and dyestuff preparation simultaneously to the dyebath, the goods are then put into the bath and the temperature slowly raised.

At the conclusion, of both processes the goods are rinsed with water and then dried, preferably at 100 to 130° C.

The process according to the invention is carried out preferably at 90 to 140° C., especially at 95 to 130° C. The process has proved particularly advantageous in high temperature processes, i.e. in the dyeing of texturised fibre materials, particularly polyester fibre materials, in pressure apparatus at temperatures of 115 to 140° C.

The textile material is also printed by conventional methods, for example by printing the woven or knitted fabric with the printing paste which, in addition to the dye, the thickener and the usual additives, e.g. urea, also contains a dyeing accelerator for use according to the invention, and fixing the dye by steaming at 100 to 200° C. with or without the application of pressure, e.g. at 100 to 200° C. for about 15 to 20 minutes or at 140 to 180° C. for about 3 to 10 minutes. Another means of fixing is heat setting at temperatures of 140 to 220° C. for about 1 to 3 minutes. The print is finished by rinsing and after-saponification. The printing pastes may also contain surface active agents, such as sulphated poly glycol ethers, fatty amides or hydroxylthylated alkyl phenols etc., additives such as alkali or ammonium salts of saturated monocarboxylic acids etc. Suitable thickeners are e.g. cellulose derivatives such as carboxymethyl cellulose or ethyl cellulose, alginated or etherified carubic acids from carob bean meal.

The printing is carried out preferably by the Vigoureux printing process.

The advantages of the present process compared with known processes, wherein diphenyl or diphenyl ethers are used as carrier substances, consists primarily in that the compounds of the formula (1) possess a greatly reduced volatility in steam, practically no unpleasant odour occurs during the dyeing or printing, the carriers have at the same time a colour balancing action and the fastness to light of the dyeings or prints is at most but slightly effected by the carriers.

In the following manufacturing instructions and Examples the parts denote parts by weight.

MANUFACTURING INSTRUCTIONS (A) A mixture of 210 g. of biphenyl, 465 g. of sodium chloride, 1000 ml. of glacial acetic acid and 300 ml. of 35% aqueous formaldehyde solution is charged into a sulphating flask and heated to 80° C. A flow of dry hydrogen chloride is then passed within 5 hours into the reaction mixture until it is saturated. Thereupon 580 ml. of 2N sulphuric acid is added dropwise while stirring and the reaction mixture is then stirred for a further 10 hours at 80° C. The contents of the flasks are then cooled, water (2000 ml.) is added and the chloromethylbiphenyl mixture is extracted with ethylene chloride. The combined ethylene chloride extracts are subsequently distilled to give 178 g. of a mixture consisting of 90% of p-chloromethylbiphenyl and 10% of o-chloromethylbiphenyl and 10% of o-chloromethylbiphenyl (b.p. 170–175° C./14 mm.).

The chloromethylbiphenyl mixture is converted into the corresponding methoxymethylbiphenyl mixture by dissolving 12 g. of sodium in 300 ml. of methanol. To this solution is added 100 g. of chloromethylbiphenyl mixture, the temperature is raised to the boiling point and the batch is stirred while boiling gently for 10 hours. The contents of the flask are then evaporated and the residue is taken up in methylene chloride. The methylene chloride extract is washed with water and evaporated. The residue, which occurs in the form of a slightly yellowish oil, corresponds to a compound mixture consisting of 90% of component of the formula (5.1) 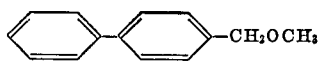

and 10% of component of the formula (5.2) 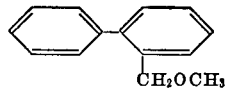

(B) A mixture of 310 g. of diphenyl ether, 180 ml. of 35% aqueous hydrochloric acid and 310 g. of aqueous formaldehyde solution is charged into a sulphating flask. A flow of dry hydrogen chloride is then passed into the reaction mixture over the course of 2 hours at a temperature of 20–30° C. and stirring is then continued for 20 hours at the same temperature. The resulting chloromethyldiphenyl mixture is then extracted with ethylene chloride. The combined ethylene chloride extracts are concentrated and the residue is distilled in vacuo to give 184 g. of chloromethyldiphenyl ether mixture (b.p. 145–150° C./1.5 mm.) consisting of 30% of o-chloromethyldiphenyl ether and 70% of p-chloromethyldiphenyl ether.

This chloromethyldiphenyl ether mixture is converted into the corresponding acetoxymethyldiphenyl ether by treating 21.8 g. of chloromethyldiphenyl ether mixture with 50 ml. of glacial acetic acid and 21.8 g. of potassium acetate and keeping the reaction mixture for 12 hours at reflux temperature. The acetic acid is subsequently distilled off and the residue is extracted with methylene chloride. The methylene chloride solution is evaporated to give the carrier mixture used in Example 2 in the form of a slightly yellowish oil in very good yield and consisting of 70% of the compound of the formula (6.1) 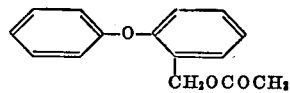

and 30% of the compound of the formula (6.2) 

The mixture C to L of the following table are obtained by methods analogous to those employed in the care of carrier mixtures A and B.

Carrier mixture K is obtained in simple manner by saponification of carrier mixture F.

(1) 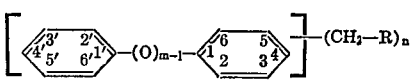

| Carrier-mixture | Significance of— | | | Position of (—CH₂—R) and composition of the mixture | | | |
|---|---|---|---|---|---|---|---|
| | $m$ | $n$ | R | Position | Percent | Position | Percent |
| A | 1 | 1 | —OCH₃ | 4 | 90 | 2 | 10 |
| B | 2 | 1 | —O—C(=O)—CH₃ | 4 | 30 | 2 | 70 |
| C | 2 | 1 | —OCH₃ | 4 | 30 | 2 | 70 |
| D | 2 | 1 | —O—C₆H₅ | 4 | 30 | 2 | 70 |
| E | 2 | 1 | —O—CH₂—C₆H₅ | 4 | 30 | 2 | 70 |
| F | 1 | 1 | —O—C(=O)—CH₃ | 4 | 80 | 2 | 20 |
| G | 1 | 1 | —O—CH(CH₃)₂ | 4 | 80 | 2 | 20 |
| H | 1 | 1 | —O—C₄H₉ | 4 | 80 | 2 | 20 |
| I | 1 | 1 | —CN | 4 | 80 | 2 | 20 |
| J | 1 | 1 | —O—C(=O)—H | 4 | 80 | 2 | 20 |
| K | 1 | 1 | —OH | 4 | 80 | 2 | 20 |
| L | 1 | 1.6 | —O—CH₃ | 4<br>6,6'<br>4,4' | 22<br>4<br>15 | 2<br>4,6' | 22<br>37 |
| M | 1 | 1.85 | —OCH₃ | 4<br>2,6'<br>4,4' | 27<br>10<br>9 | 2<br>2,4' | 8<br>24 |
| N | 2.2 | | —O—C(=O)—CH₃ | 4<br>2,6'<br>4,4' | ¹22<br>23<br>12<br>8<br>¹23 | 2<br>2,4' | 8<br>26 |

¹ Trisubstituted homologs.

EXAMPLE 1

A solution of 2.5 g. of the carrier mixture according to Instruction (A) in 7.5 g. of isopropanol is stirred into 1000 ml. of a warm (65° C.) dyebath which contains 0.5 g. of ammonium sulphate and 0.5 g. of a condensation product of naphthalenesulphonic acid and formaldehyde. A polyester fabric (25 g.) is then put into the dyebath and the goods are treated for 5 minutes at constant temperature. Then 50 ml. of an aqueous suspension which contains 1 g. of a dyestuff mixture consisting of the components (7.1)

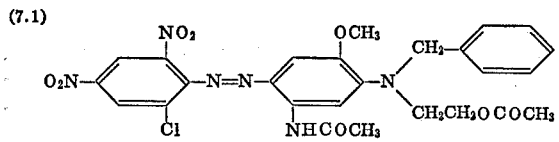

and (7.2)

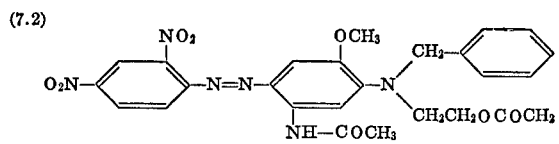

in the mixture ratio of 3:1 is added. The temperature of the dyebath is kept for a further 5 minutes at 65° C. Then the bath is brought to the boil in 30 minutes and subsequently kept boiling gently for 90 minutes.

The bath is then cooled, the goods are rinsed with warm water of 60° C. and then with water of 20° C., and dried at 120° C. A very uniform navy blue dyeing is obtained in this way with almost complete exhaustion of the dyebath.

EXAMPLE 2

To 1000 ml. of a warm (65° C.) dyebath which contains 0.5 g. of ammonium sulphate and 1.0 g. of a condensation product of naphthalenesulphonic acid and formaldehyde are added 6 g. of a carrier mixture according to Instruction (B), 0.9 g. of glycerol, 1.6 g. of water, 0.3 g. of dioctylsulphosuccinate and 0.15 g. of a condensation product of naphthalenesulphonic acid and formaldehyde to give a fine suspension. A polyester fabric (25 g.) is then put into this bath and the textile material is treated for 10 minutes at constant temperature. To the dyebath is then added 40 ml. of a warm (60° C.) aqueous suspension containing 0.5 g. of the dyestuff of the formula (8)

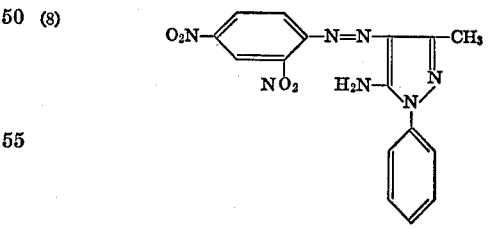

and after some minutes the temperature is rinsed within 45 minutes successively to the boiling point and then dyeing is carried out for a further 90 minutes while boiling gently.

The bath is then cooled and the goods are rinsed with warm (60° C.) water and then dried at 100° C. A very pure orange dyeing is obtained in this way. Dyeings of similarly good quality are obtained by substituting carriers C, D and E for carrier B.

EXAMPLE 3

A mixture of 360 ml. of water, 0.8 g. of ammonium sulphate and 0.04 ml. of 85% aqueous formic acid is charged into a high temperature circulating apparatus. To this mixture are added at 50° C. 1 g. of a mixture consisting of 0.5 g. of the carrier mixture K, 0.15 g. of glycerol, 0.27 g. of water, 0.05 g. of dioctylsulphosuccinate and 0.025 g. of a condensation product of naphthalenesulphonic acid and formaldehyde and 40 ml. of a warm (60° C.) aqueous dispersion containing 0.5 g. of the dyestuff of the formula (9)

$$O_2N-\underset{NO_2}{\underset{|}{\bigcirc}}-\underset{Cl}{\underset{|}{\bigcirc}}-N=N-\underset{NH-CH_2CH_2OH}{\underset{|}{\bigcirc}}\underset{N}{\overset{N}{\underset{\|}{\bigcirc}}}-NH-C_2H_5$$

A polyester fabric (25 g.) is then put into this dyebath and the temperature of the bath is raised to 130° C. within 45 minutes. Dyeing is carried out for a further 15 minutes at this temperature, the bath is then cooled and the fabric is rinsed with warm and with cold water. A brilliant red dyeing which is completely free from deposits is obtained in this way.

If in this Example the process is carried out without the addition of a carrier, a very much weaker dyeing results which displays in places strong deposits of dyestuff. Dyeings of lesser quality result if in this Example a corresponding amount of diphenyl or the same amount of trichlorobenzene is used instead of the two hydroxymethyldiphenyls. Pure, red dyeings of good fastness to rubbing are obtained by substituting the carrier F, G, H, I or J for the carrier K.

Example 4

Water (370 ml.) is initially introduced into a high-temperature circulating apparatus and 0.8 g. of ammonium sulphate and 0.04 ml. of 85% aqueous formic acid are added. To this aqueous solution, and at a temperature of 65° C., is added 1.6 g. of a mixture consisting of 0.8 g. of carrier mixture L, 0.22 g. of glycerol, 0.5 g. of water and 0.08 g. of dioctylsulphosuccinate and also 30 ml. of a warm (60° C.) aqueous dispersion containing 0.8 g. of the dyestuff of the formula (10)

$$\bigcirc-N=N-\bigcirc-N=N-\underset{SO_2NHCH_2CH_2CH_2OCH_3}{\underset{|}{\bigcirc\bigcirc}}^{OH}$$

A piece of knitted fabric (20 g.) made from texturised polyglycol terephthalate fibres is put into the dyebath and the temperature of the bath is raised to 125° C. within 45 minutes.

Dyeing is subsequently carried out for a further 30 minutes at this temperature. The bath is then allowed to cool, the fabric is rinsed with warm and with cold water and dried. A very uniform, pure, yellowish red dyeing of good fastness to rubbing is obtained in this way. In the process, the dyebath is completely exhausted. Good results are likewise obtained by using 0.1 g. of the carrier mixture L.

EXAMPLE 5

The process is carried out as described in Example 1, but with a cellulose triacetate fabric being substituted for the polyester fabric and the dyestuff of the formula (11)

$$\underset{O}{\overset{O}{\underset{\|}{\bigcirc\bigcirc}}}\underset{NH-\bigcirc}{\overset{NH_2}{|}}$$

being substituted for the dyestuff of the formulae (7.1) and (7.2), a very uniform dark blue dyeing is obtained.

EXAMPLE 6

Water (370 g.) is initially introduced into a high-temperature circulating apparatus and 0.8 g. of ammonium sulphate and 0.04 ml. of 85% aqueous formic acid are added. To this aqueous solution, and at a temperature of 65° C., are added 0.75 g. of a mixture consisting of 0.45 g. of carrier mixture M, 0.2 g. of the ammonium salt of the acid sulphuric acid ester of the adduct of nonylphenol and 10 moles of ethylene oxide, as well as 30 ml. of a warm (60° C.) aqueous dispersion containing 0.8 g. of the dyestuff of the formula 9.

A piece of knitted fabric (20 g.) made from texturised polyglycol terephthalate fibres is then put into the dyebath and the temperature of the bath is raised to 125° C. within 45 minutes. Dyeing is carried out for a further 30 minutes at this temperature, the bath is then cooled and the fabric rinsed with warm and with cold water. A brilliant red dyeing which is free from deposits is obtained in this way. The migratory action of the carrier is very good.

EXAMPLE 7

In Example 6 the carrier mixture is replaced by 0.75 g. of a mixture consisting of 0.45 g. of carrier mixture N, and 0.3 g. of the ammonia salt of the acid sulphuric acid ester of the adduct of nonylphenyl and 10 moles of ethylene oxide, and the dyeing process is carried out according to Example 6, a uniform red dyeing of similar quality is obtained.

EXAMPLE 8

A texturised piece of polyester fabric is printed with a printing paste which contains 500 g. of neutral etherified carubic acids (16%) (thickener), 410 g. of water, 50 g. of sodium nitrobenzenesulphonate, 10 g. of sulphated pine oil and 30 g. of carrier mixture M as well as 30 g. of finely dispersed dyestuff of the formula (12)

$$O_2N-\bigcirc-N=N-\bigcirc-N\underset{CH_2CH_2OCH_2CH_2CN}{\overset{CH_2CH_2CN}{<}}$$

and then subjected heat setting process for 2 minutes at 170° C. The printed fabric is purified by reduction in an aqueous bath which contains 2 g. of sodium hydrosulphite per litre. A fabric which is printed uniform orange is obtained in this way. No unpleasant odour occurs during the whole process. Intead of the heat setting at 170° C. it is also possible to effect a steaming process at 165° C. over the course of 8 minutes.

What is claimed is:

1. A process for dyeing or printing synthetic fibre material with a disperse dyestuff in an aqueous dyebath or printing paste, containing a dyeing accelerator of the formula $$\left[\bigcirc-(O)_m-\bigcirc\right]-O \text{ or } p(CH_2R)_n$$

wherein m is 0 or 1,
n is 1 or 2, and
R is cyano, hydroxy, methoxy or acetoxy.

2. The process of claim 1, wherein m is 0, n is 1, and the substituent position is para.

3. The process of claim 2, wherein the synthetic fibre material is a blend containing polyester fibres.

4. The process of claim 1, wherein dyeing is carried out at 90 to 140° C.

5. The process of claim 3, wherein dyeing is carried out at 90 to 140° C.

6. The process of claim 1, wherein the dyeing accelerator is present in the dyebath at a concentration of 0.1 to 10 g./l.

7. The process of claim 5, wherein the dyeing accelerator is present in the dyebath at a concentration of 0.1 to 10 g./l.

8. The process of claim 1, wherein the dyeing accelerator is present in the dyebath at a concentration of 0.5 to 10 g./l.

9. The process of claim 1, wherein the fabric is printed and then subjected to a heat fixing process at 140 to 220° C.

References Cited
UNITED STATES PATENTS

| | | | |
|---|---|---|---|
| 2,306,880 | 12/1942 | Heymann | 8—173 X |
| 3,493,981 | 2/1970 | Noda | 8—172 |
| 3,114,588 | 12/1963 | Lewis | 8—172 X |

DONALD LEVY, Primary Examiner

U.S. Cl. X.R.

8—62, 173

UNITED STATES PATENT OFFICE
CERTIFICATE OF CORRECTION

Patent No. 3,822,997  Dated July 9, 1974

Inventor(s) HANS WEGMUELLER ET AL

It is certified that error appears in the above-identified patent and that said Letters Patent are hereby corrected as shown below:

Column 5, line 61, in formula 7.2, change "$CH_2CH_2OCOCH_2$" to -- $CH_2CH_2OCOCH_3$ --.

Column 8, claim 1, line 57, change "O or p" to -- $\underline{o}$ or $\underline{p}$ --.

Signed and sealed this 19th day of November 1974.

(SEAL)
Attest:

McCOY M. GIBSON JR.
Attesting Officer

C. MARSHALL DANN
Commissioner of Patents